H. B. LIVERMORE.
FISH HOOK.

No. 51,951. Patented Jan. 9, 1866.

UNITED STATES PATENT OFFICE.

H. B. LIVERMORE, OF ASHLAND, PENNSYLVANIA.

IMPROVEMENT IN FISH-HOOKS.

Specification forming part of Letters Patent No. 51,951, dated January 9, 1866.

*To all whom it may concern:*

Be it known that I, H. B. LIVERMORE, M. D., of Ashland, in the county of Schuylkill and State of Pennsylvania, have invented a new and useful Improvement in Fish-Hooks; and I do hereby declare that the following is a full, clear, and exact description thereof, which will enable others skilled in the art to make and use the same, reference being had to the accompanying drawings, forming part of this specification, in which—

Figure 1:
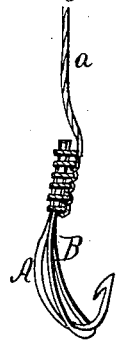
Figure 2:
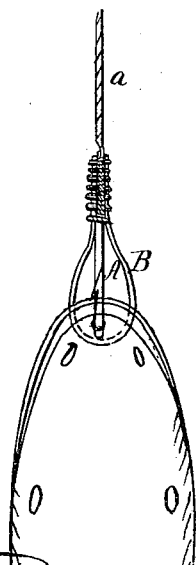

Figure 1 is a perspective view of a fish-hook with my invention applied to it. Fig. 2 is a front view of the same.

My invention consists in attaching to an ordinary fish-hook a guard so constructed and arranged that it will cause the hook to surely catch into the upper or lower jaw of the fish, and therefore obviates the liability of the hook turning sidewise in the mouth of the fish and being drawn out without catching in the jaws of the fish.

A designates a fish-hook of the ordinary kind, which is attached to its line *a* in any suitable way.

B is a wire loop, which I term a "guard," and in the present instance it consists merely of a piece of wire bent in the form of a loop and placed over the hook, as shown clearly in Fig. 2, the ends being connected to the head of the hook in any suitable way. The position of this guard is such that the hook will be compelled to lie or rest in a position with its point upward or downward—that is to say, if it be taken into the mouth of the fish, it cannot fall over on its side, but must lie with the point of the hook in just the position to catch into either the upper or under jaw of the fish first, accordingly as he seizes the bait.

With an ordinary hook there is great liability of the hook falling over on its side and being drawn out of the fish's mouth without catching, and indeed this often occurs when his mouth is shut; and, again, a fish is obliged to catch a hook provided with one of my guards in such a manner that the certainty of his being caught, if he bite, is insured; and, further, the loop, instead of being repulsive to the fish, is rather the contrary. The fish sees it at a great distance and is attracted toward it.

The guards or loops can be made of different sizes and shapes to suit different styles and sizes of hooks, and may be attached in different ways and still effect the same end.

What I claim as new, and desire to secure by Letters Patent, is—

The guard or loop B, applied to a fish-hook, substantially as and for the purpose specified.

H. B. LIVERMORE, M. D.

Witnesses:
 JOHN SULLIVAN,
 GEO. D. HAUGHAWOAT.